United States Patent
Chen et al.

(10) Patent No.: US 7,693,243 B2
(45) Date of Patent: Apr. 6, 2010

(54) METHOD AND CIRCUIT FOR TIMING RECOVERY

(75) Inventors: Tien-Hui Chen, Taipei (TW); Jeff Lin, Taipei (TW); Yi-Sheng Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 1162 days.

(21) Appl. No.: 11/235,714

(22) Filed: Sep. 26, 2005

(65) Prior Publication Data

US 2007/0071152 A1  Mar. 29, 2007

(51) Int. Cl.
*H04L 7/00* (2006.01)
(52) U.S. Cl. ........................ 375/355; 375/362
(58) Field of Classification Search ................ 375/344, 375/354, 355, 362
See application file for complete search history.

(56) References Cited

U.S. PATENT DOCUMENTS

| | | | | |
|---|---|---|---|---|
| 5,258,933 A | * | 11/1993 | Johnson et al. | 708/3 |
| 6,795,515 B1 | * | 9/2004 | Riedle et al. | 375/355 |
| 2002/0021767 A1 | * | 2/2002 | Greiss et al. | 375/316 |
| 2003/0161430 A1 | * | 8/2003 | Sou | 375/376 |
| 2005/0249275 A1 | * | 11/2005 | Yen et al. | 375/232 |

* cited by examiner

*Primary Examiner*—Chieh M. Fan
*Assistant Examiner*—Freshteh N Aghdam
(74) *Attorney, Agent, or Firm*—Thomas, Kayden, Horstemeyer & Risley

(57) ABSTRACT

A circuit and method for timing recovery. The circuit for timing recovery comprises an converter, a timing recovery controller, and a initial phase generator. The converter converts an input signal to sample data with a sampling signal. The timing recovery controller is coupled to the converter, and determines the sampling signal. And the initial phase generator is coupled to the AD converter, detects a change with the sample data only, produces an initial phase based on the change, and controls the sampling signal.

7 Claims, 6 Drawing Sheets

METHOD AND CIRCUIT FOR TIMING RECOVERY

BACKGROUND

The invention relates in general to timing recovery, and in particular, to an initial phase for a timing recovery circuit.

Timing recovery synchronizes data in an input signal and a local sampling signal associated with a sampling frequency and a sampling phase. Locking the sampling frequency involves estimating the data period, such that samples can be taken at a correct rate without losing data. Locking the sampling phase requires evaluating the correct time within a data period to take a sample. Data typically peaks at the center of a data period, with sampling thereof providing optimum signal to noise ratio (SNR) and more robust transmission. Consequently, timing recovery is commonly realized by altering the sampling frequency and the sampling phase such that the input signal is sampled at the peak.

Timing recovery schemes rely on sampling of the input signal close to the data peak with the sampling signal to yield a train of sample data, from which is generated a series of timing errors tracking both sampling frequency and phase errors for correction of the sampling signal. A requirement for fast convergent and accurate sampling signal is to sample as close to data peak as possible. If the input signal is sampled at data transition, the timing recovery scheme cannot evaluate the timing error correctly, such that the sampling signal cannot reach convergence rapidly.

FIG. 1 is a block diagram of a conventional timing recovery circuit, in which timing recovery circuit 1 comprises Analog to Digital (AD) converter 10, Mueller and Muller timing recovery controller 12, phase generator 14, slicer 16 and equalizer output 18.

Both Mueller and Muller timing recovery controller 12 and phase generator 14 are coupled to AD converter 10, which receives input signal Sin, samples input signal Sin with sampling signal Ssp from phase generator 14, and renders a series of sample data Di to Mueller and Muller timing recovery controller 12, together with hard decision data Dh from slicer 16 produces timing error Te controlling phase generator 14, such that the phase of sampling signal Ssp is synchronized with the data in input signal Sin, and the data peaks are sampled at AD converter 10. After equalization is stable, Mueller and Muller timing recovery controller 12 switches to equalizer output 18 to replace slicer 16 for hard decision data Dh.

Upon initialization of the timing recovery process, phase generator 14 delivers sampling signal Ssp with an arbitrary phase selection to AD converter 10. If the arbitrary phase is close to the transient edge of the data, false sample data Di may be taken and directed to Mueller and Muller timing recovery controller 12, which in turn produces inaccurate timing error Te and brings slow convergence to the data synchronization.

Thus a method and circuit for timing recovery with an initial phase is proposed.

SUMMARY

The present invention is directed to a circuit and method for timing recovery.

According to one embodiment of the invention, The circuit for timing recovery comprises an converter, a timing recovery controller, and a initial phase generator. The converter converts an input signal to sample data with a sampling signal. The timing recovery controller is coupled to the converter, and determines the sampling signal. And the initial phase generator is coupled to the AD converter, detects a change with the sample data only, produces an initial phase based on the change, and controls the sampling signal.

In accordance to another embodiment of the invention, a method for timing recovery comprises sampling an input signal with a sample signal as sample data in a converter, detecting a change with the sample data only in an initial phase generator, producing an initial phase in the initial phase generator based on the change to control the sample signal, and determining the sampling signal with the sample data controlled by the initial phase in a timing recovery controller.

BRIEF DESCRIPTION OF THE DRAWINGS

The invention will become more fully understood from the detailed description, given hereinbelow, and the accompanying drawings. The drawings and description are provided for purposes of illustration only and, thus, are not intended to be limiting of the present invention.

DETAILED DESCRIPTION

For simplicity, while this disclosure of the invention is incorporated into an Ethernet Local Area Network (LAN) system, the circuitry and method disclosed may also find application in other systems, and those skilled in the art may make modifications where appropriate based on the principle of the invention.

Figure 1:
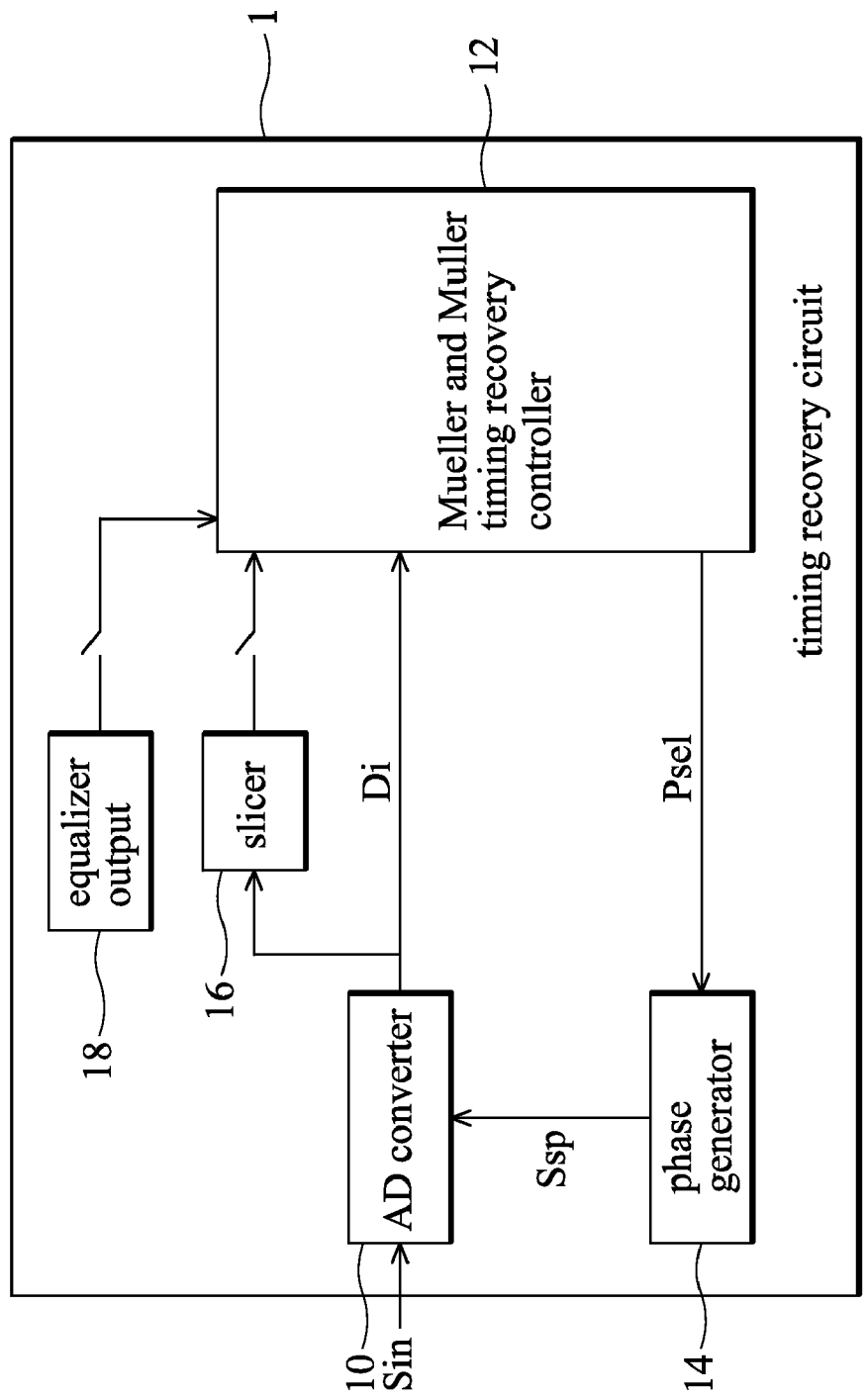
FIG. 1 is a block diagram of a conventional timing recovery circuit.
Figure 2:
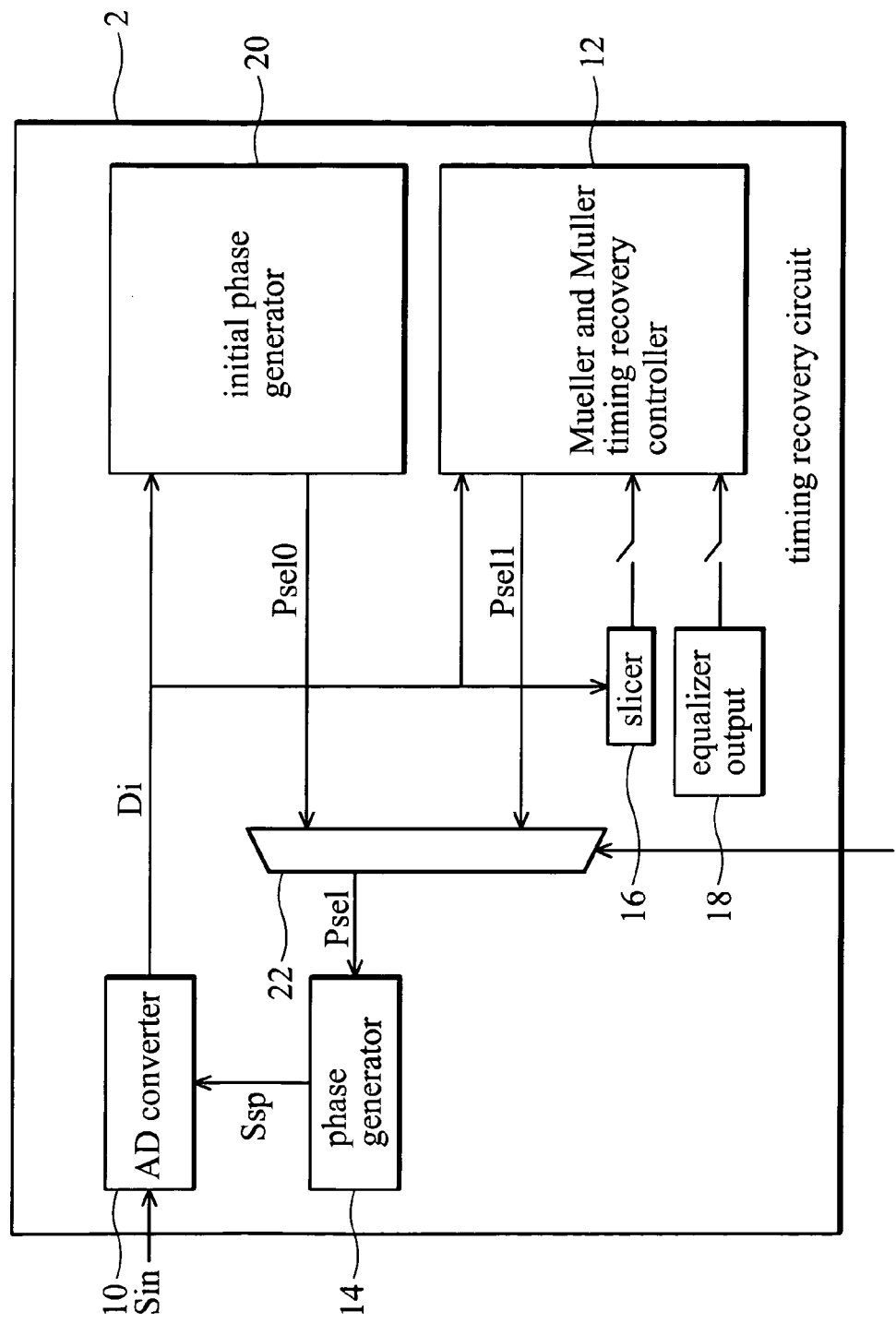
FIG. 2 is a block diagram of a timing recovery circuit according to an embodiment of the present invention.

FIG. 2 is a block diagram of a timing recovery circuit 2 according to an embodiment of the invention, comprising primarily AD Converter 10, Mueller and Muller timing recovery controller 12, phase generator 14, initial phase generator 20, and multiplexer 22.

AD converter 10 is coupled to initial phase generator 20, Mueller and Muller timing recovery controller 12, multiplexer 22, and thence to phase generator 14. AD converter 10 receives input signal Sin and sampling signal Ssp, samples input signal Sin with the sampling signal Ssp, and generates sample data Di. Input signal Sin is an analog signal external to timing recovery circuit 2. Sampling signal Ssp may be a clock signal, and the phase and the frequency of the sampling signal Ssp adjustable. Sample data Di are a series of discrete digital data, and indicates the ith sample data at time position Ti on a time frame with a length T.

Mueller and Muller timing recovery controller 12 is initialized by sampling signal Ssp with initial phase Pini, controls sampling signal Ssp to AD converter 10, receives sample data Di from AD converter 10, iterates the sampling phase of sampling signal Ssp via phase signal Psel1, and outputs and converges to a stable sampling signal Ssp.

Phase generator 14 acquires phase signal Psel, generates sampling signal Ssp with sampling phase designated by phase signal Psel, and delivers sampling signal Ssp to AD converter 10.

Initial phase generator 20 issues phase signal Psel0 to assign sampling signal Ssp to AD converter 10, accepts sample data Di from AD converter 10, detects changes in sample data Di, and produces initial phase Pini of sampling signal Ssp, such that input signal Sin may be sampled in proximity to the data peak.

Multiplex 22 accepts initialization signal Sini, from which either phase signal Psel0 from initial phase generator or phase signal Psel1 from Mueller and Muller timing recovery controller 12 is selected, and directs as phase signal Psel to phase generator 14.

Figure 3:
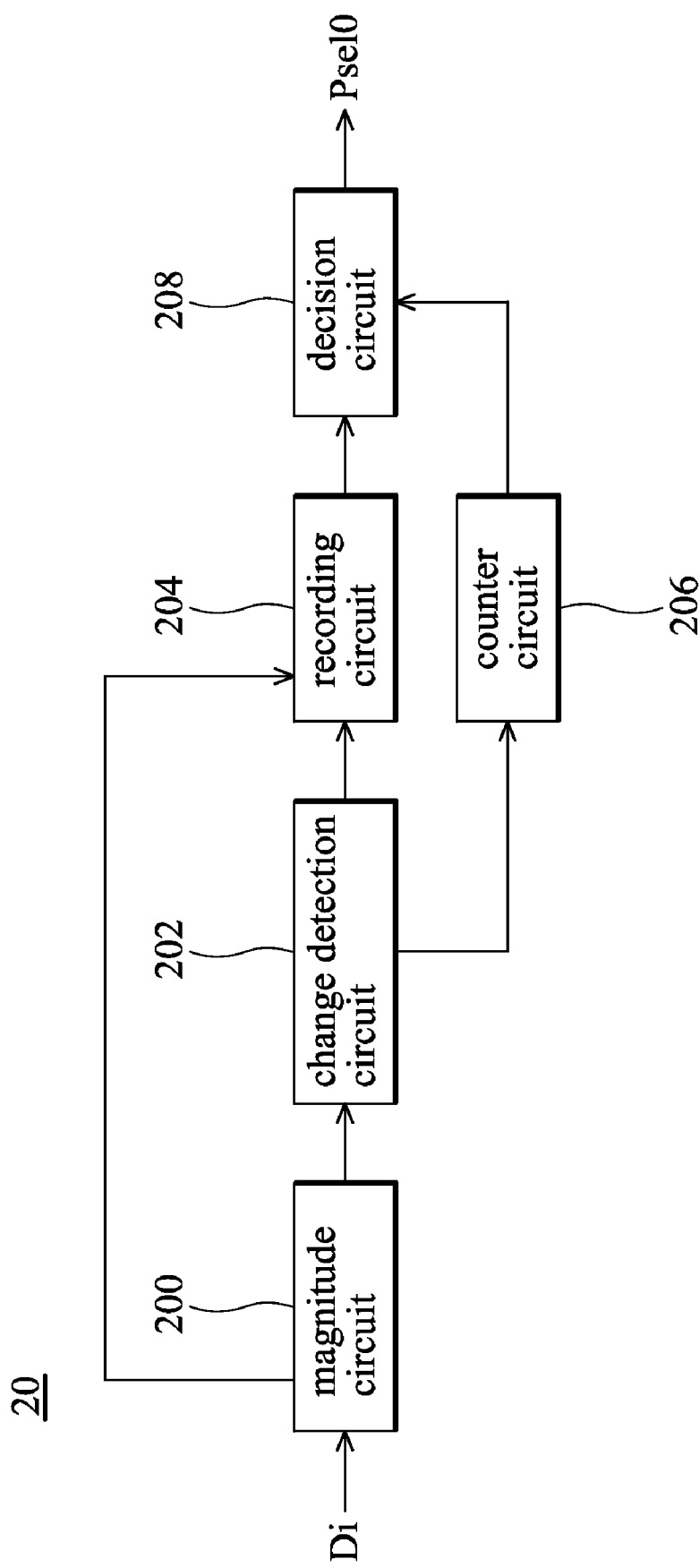
FIG. 3 is a block diagram for a circuit implementation of initial phase generator 20 in FIG. 2, according to one embodiment of the present invention.

FIG. 3 shows a block diagram for the circuit implementation of initial phase generator 20 in FIG. 2, according to one embodiment of the invention. Initial phase generator 20 comprises change detection circuit 202, recording circuit 204, counter circuit 206, decision circuit 208, and an optional magnitude circuit 200.

Magnitude circuit 200 is coupled to AD converter 10 and change detection circuit 202 and is optional depending on the implementation of initial phase generator 20. Magnitude circuit 200 receives sample data Di from AD converter 10, and evaluates thereof with respect to an average magnitude. For example, sample data Di with data values 1, 0, and −1 may have an average magnitude of 0 and magnitude of the sample data Di are 1, 0, 1 respectively.

Change detection circuit 202 is coupled to AD converter 10, to recording circuit 204, and thence to decision circuit 208. Change circuit 260 accepts sample data Di from AD converter 10, and detects the change in the sample data Di. The change may, for example, be detected where there is a data difference of "logical high" and "logical low" between consecutive sample data Di−1 and Di.

Recording circuit 204 records change information of the change, which may be a time position Ti in the time frame. In an embodiment, recording circuit 204 may count the change at each time position Ti upon detection of a change in sample data Di, and records the result as decision data Ci. In another embodiment, recording circuit 204 may sum corresponding sample data Di at each time position Ti, and record the result as a decision data Ci. Each decision data Ci may be recorded with the corresponding time position Ti as the change information.

Decision circuit 208 obtains change information, from which it produces phase signal Psel0 as initial phase Pini. It may accept change information comprising predetermined sets of time position Ti and decision data Ci pair, compare the decision data Ci, determine a most likely time position Tsw prompting a data change, by which an initial phase Pini is generated. If the decision data Ci is a count of the change, decision circuit 208 may determine a maximum decision data among all the decision data Ci, since the maximum decision data indicates time position Tsw where the most data changes occur. If the decision data Ci is a sum of sample data Di, decision circuit 208 may determine the minimum decision data among all the decision data Ci, because the minimum decision data corresponds to a time position Tsw where the most data changes occur.

Initial phase generator 20 may further comprise a counter circuit 206 coupled to change detection circuit 202 and decision circuit 208. Counter circuit 206 counts every change in sample data Di, and enables decision circuit 208 when a predetermined count of the change is met. The predetermined count prevents decision circuit 208 from generating initial phase Pini until a sensible sample size of data change is established, delivering a more reliable data change detection in decision circuit 208. In an embodiment, the predetermined count is set to be 5, such that decision circuit 208 produces and delivers initial phase Pini upon collecting 5 samples of the data change.

Figure 4:
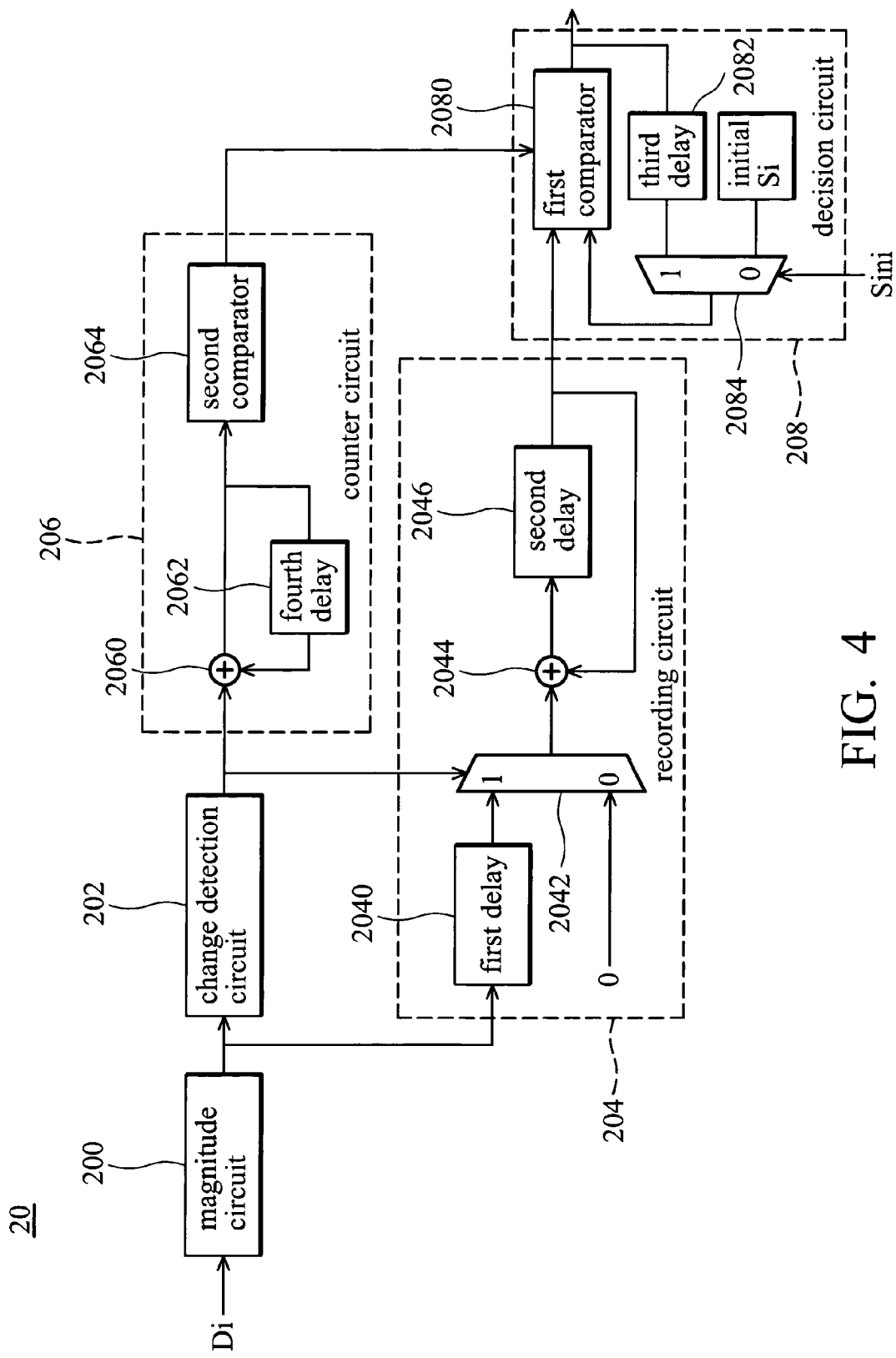
FIG. 4 is a circuit schematic diagram of the initial phase generator in FIG. 3.

FIG. 4 is a circuit schematic diagram of the initial phase generator in FIG. 3.

Initial phase generator 20 comprises magnitude circuit 200, change detection circuit 202, recording circuit 204, counter circuit 206, and decision circuit 208.

Recording circuit 204 records change information of the consecutive sample data Di, and comprises first delay 2040, first multiplexer 2042, first adder 2044, and second delay 2046. The first delay 2040 is coupled to magnitude circuit 200, accepting and delaying sample data Di with a first delay. The first multiplexer 2042 is coupled to the first delay 2040 and change detection circuit 202. The first adder 2044 is coupled to the first multiplexer 2042. The second delay 2046 is coupled to the first adder 2044.

The first delay 2040 accepts and postpones sample data Di for a first delay period, then delivers sample data Di to the first multiplexer 2042. Upon detection of a change in two consecutive sample data Di and Di+1 in change detection circuit 202, change detection signal Sch selects sample data Di through the first multiplexer 2042 to the first adder 2044 as first adder input Da. If there is no change between data Di and Di+1, change detection signal Sch then chooses "logic 0" as the first adder input Da. The first adder 2044 loads the ith addition registers and adds the first adder input Da, rendering ith data sum as a decision data Ci to decision circuit 208.

Decision circuit 208 comprises the first comparator 2080, the third delay 2082, and the second multiplexer 2084. The first comparator 2080 is coupled to the third delay 2082, subsequently coupled to the second multiplexer 2084.

Target sum St is initially determined in the actual implementation as a fixed quantity and is an upper boundary of decision data Ci. When decision enable signal De is received from counter circuit 206, the first comparator 2080 compares the decision data Ci with target sum St, retains decision data Ci as the new target sum St and outputs phase selection signal Psel0 if decision data Ci is less than target sum St. If decision data Ci is not less than target sum St, recorder circuit 204 and counter circuit 206 are reset, and more data samples Di are taken to establish a reliable sample of data changes, until the upper boundary of target sum St is met by decision data Ci.

Counter circuit 206 comprises the second adder 2060, the fourth delay 2062, and the second comparator 2064. Second adder 2060 is coupled to the fourth delay 2062 and the second comparator 2064. The second adder 2060 increments change count Dch by one if a change in two consecutive sample data Di and Di+1 is detected. Change count Dch is subsequently directed to the fourth delay 2062 and the second comparator 2064, compared with a target count in the second comparator 2064, and delayed for a third period in the fourth delay 2062 for the next change count. The second comparator 2064 issues decision enable signal De to decision circuit 208 upon change count Dch meeting the target count, determined upon actual implementation although 5 is used here.

Figure 5:
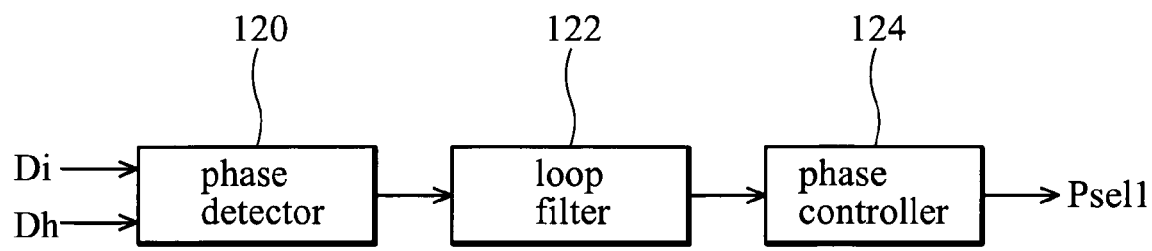
FIG. 5 is a block diagram of the Mueller and Muller timing recovery controller in FIG. 2.

FIG. 5 is a block diagram of the Mueller and Muller timing recovery controller in FIG. 2.

Timing recovery controller 12 comprises phase detector 120, loop filter 122 and phase shift controller 124. Phase detector 120 is coupled to loop filter 122, in turn coupled to phase shift controller 124.

Phase detector 120 receives sample data Di from AD converter 10 and hard decision data Dh from slicer 16 or equalizer output 18, thereby estimating and directing timing error Te to loop filter 122. Loop filter 122 filters undesired frequency components from timing error Te and passes the resultant timing error Te to phase shift controller 124. Phase shift controller 124 determines phase selection signal Psel to phase generator 14.

Figure 6:
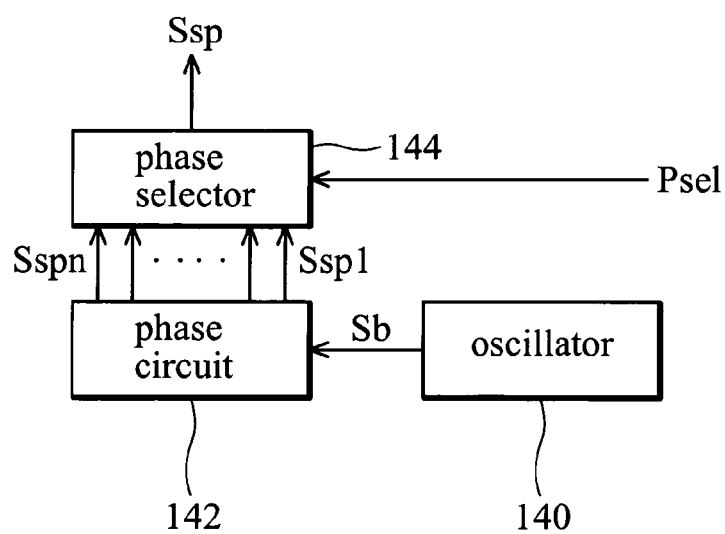
FIG. 6 is a block diagram of the phase generator in the embodiment of FIG. 2.

FIG. 6 is a block diagram of the phase generator in FIG. 2. Phase generator 14 comprises oscillator 140, phase circuit 142, and phase selector 144. Oscillator 140 is coupled to phase circuit 142, and thence to phase selector 144.

Oscillator 140 produces base sampling signal Sb with a sampling frequency. The sampling frequency may be identical or differ slightly from the frequency of the incoming data in input signal Sin. Phase circuit 142 subsequently accepts base sampling signal Sb and generates N sampling signals with N different phases to phase selector 144, where N is an integer determined in application. Phase selector 144 selects a sampling signal Ssp from N sampling signals based on phase selection signal Psel from initial phase generator 20 or timing recovery controller 12, and delivers sampling signal Ssp to AD converter 10.

Figure 7:
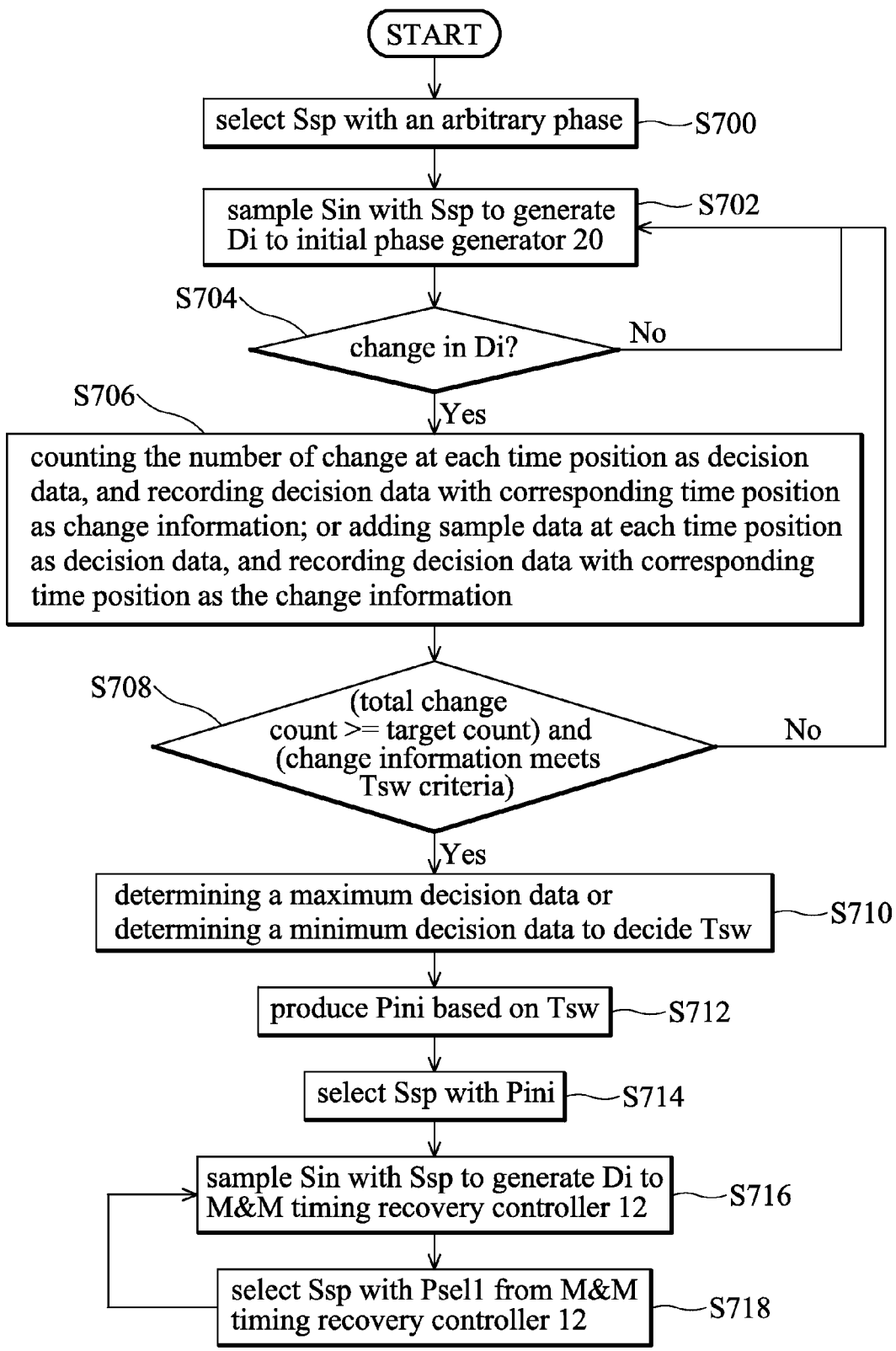
FIG. 7 is a flowchart for a timing recovery method incorporating the timing recovery circuit in FIG. 2 and FIG. 3, according to one embodiment of the present invention.

FIG. 7 presents a flowchart for a method of timing recovery incorporating the timing recovery circuit in FIG. 2 and FIG. 3.

Upon initialization of the timing recovery method, in Step s700 an arbitrary phase of sampling signal Ssp is selected. An arbitrary phase selection signal Psel0 is issued by initial phase generator 20, directed to phase generator 14 through multiplexer 22 and initialization signal Sini, and controls the phase of sampling signal Ssp to AD converter 10.

In Step s702, input signal Sin is sampled with sampling signal Ssp in AD converter 10 to generate sample data Di to initial phase generator 20, where sample data Di represents ith sample data at a time position Ti in the time frame. The time frame is partitioned by some predetermined sampling points, each representing unique time position Ti on the time frame, distributed in a regular or irregular manner.

Initial phase generator 20 may control the sampling frequency of sampling signal Ssp at a slightly different initial sampling period Tini than the normal sampling period T, which may be equivalent to the data period on Ethernet LAN. As a result, there are (T/|Tini−T|) sampling points on the time frame. AD converter 10 samples successive time position Ti along the time frame sequentially, and completes a sampling cycle for every time position Ti in (T/|Tini−T|) turns. Alternatively, Initial phase generator 20 may control the sampling frequency such that each time position Ti is set apart from the previous one Ti−1 by a step size Δt, such that there is a total number of (T/Δt) time position Ti across the time frame. Further, magnitude circuit 200 may accept sample data Di from AD converter 10, take the magnitude of sample data Di and pass sample data to change detection circuit 202, such that the sample data with the average magnitude, or middle of a transient, yields the smallest value.

In Step s704, the ith sample data Di is accepted in change detection circuit 202, and compared with previous sample data Di−1 to evaluate the data difference. If there is no difference, the timing recovery process loops back to Step s702, where data sample Di+1 is collected and change detection circuit 202 conducts comparison process thereof for data sample Di+1. If a data change is detected, the corresponding change information is recorded in recording circuit 204 in Step s706. The change information may be time position Ti+1 at the change.

Recording circuit 204 may count the number of change at each time position Ti as decision data Ci, and record decision data Ci with corresponding time position Ti as the change information. Recording circuit 204 may also add sample data Di at each time position Ti as decision data Ci, and record decision data Ci with corresponding time position Ti as the change information.

In Step s708, the count of data change is compared with a predetermined count, so that a sensible sample size of the data change may be established in initial phase generator 20. If the count of the data change does not reach the predetermined count, the timing recovery method returns to Step s702 for more samples; or it determines a switching time position Tsw where sample data Di changes most frequently in Step s710.

Thus in Step s710, decision circuit 208 is enabled to evaluate the change information for switching time position Tsw. Where the change information containing time position Ti and decision data Ci, decision circuit 208 may compare all decision data Ci to determine a maximum decision data Cmax, suggesting a time position Tsw where the most data changes happen. As for some other embodiments where the change information includes time position Ti and corresponding decision data Ci, decision circuit 208 may compare all decision data Ci to determine a minimum decision data Cmin, indicating time position Tsw where the data change may be expected.

In Step s712, decision circuit 264 produces initial phase Pini as phase signal Psel0 to phase generator 14. Since the data change is expected at switching time position Tsw, initial phase Pini is generated such that input signal Sin is not sampled at the data transient, providing more accurate sample data Di, a convergentable loop for Mueller and Muller timing recovery.

Subsequently in Step s714, sampling signal Ssp is selected through initial phase Pini to derive a fast convergence of Mueller and Muller timing recovery. At this point, Psel0 is no longer required, therefore multiplexer 22 switches to phase signal Psel1 from Mueller and Muller timing recovery controller 12.

In Step s716, input signal Sin is sampled with sampling signal Ssp in AD converter 10, to generate sample data Di to Mueller and Muller timing recovery controller 12. In Step s718, the timing recovery loop then proceeds to select the next round of sampling signal Ssp with Mueller and Muller timing recovery controller 12, and going through multiplexer 22, phase generator 14, then AD converter 10. The method then alternates between Step s716 and Step s718 until timing recovery is complete.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A timing recovery circuit, comprising:
a converter converting an in put signal to sample data with a sampling signal;
a timing recovery controller coupled to the converter and determining the sampling signal; and
an initial phase generator, coupled to the converter, for detecting a change with the sample data only, producing an initial phase based on the change, and controlling the sampling signal, comprising:
a change detection circuit, coupled to the converter, for detecting the change in two of the sample data;
a decision circuit, coupled to the change detection circuit, for producing the initial phase based on the change;

a recording circuit, coupled to the change detection circuit and the decision circuit, for recording a change information of the change, wherein the change information comprises a time position of the change in a time frame, and the recording circuit further sums sample data at the time position as decision data for the decision circuit to produce the initial phase, wherein the decision circuit further determines a minimum decision data among all the decision data, and produces the initial phase based thereon; and a counter, coupled to the change detection circuit and the decision circuit, for counting the change as a change count, and enabling the decision circuit upon the change count meeting a target count.

2. The timing recovery circuit of claim 1, wherein the timing recovery controller is a Mueller and Muller timing recovery controller.

3. The timing recovery circuit of claim 1, further comprising a multiplexer coupled to the initial phase generator and the timing recovery controller, and directing the initial phase from the initial phase generator or a phase selection signal from the timing recovery controller based on an initialization signal to determine the sampling signal.

4. The timing recovery circuit of claim 1, further comprising a magnitude circuit coupled to the initial phase generator, and evaluating magnitude of the sample data with respect to an average magnitude of the sample data.

5. A method for timing recovery, comprising: sampling an input signal with a sample signal as sample data in a converter; detecting a change with the sample data only in an initial phase generator;

producing an initial phase in the initial phase generator based on the change to control the sample signal; and determining the sampling signal with the sample data controlled by the initial phase in a timing recovery controller;

recording change information of the change in the initial phase generator, wherein the change information comprises a time position of the change in a time frame counting the change as a change count in the initial phase generator; enabling a decision circuit in the initial phase generator upon the change count meeting a target count; and wherein the initial phase in the decision circuit is produced in the initial phase generator;

summing corresponding sample data at the time position as decision data in the initial phase generator;

determining a minimum decision data among all of the decision data in the decision circuit; and producing the initial phase based on the minimum decision data in the decision circuit.

6. The method of claim 5, wherein the timing recovery controller is a Mueller and Muller timing recovery controller.

7. The method of claim 5, further comprising directing the initial phase from the initial phase generator or a phase selection signal from the timing recovery controller based on an initialization signal in a multiplexer to determine the sampling signal.

* * * * *